United States Patent [19]
Robinson et al.

[11] Patent Number: 5,168,560
[45] Date of Patent: Dec. 1, 1992

[54] MICROPROCESSOR SYSTEM PRIVATE SPLIT CACHE TAG STORES WITH THE SYSTEM TAG STORE HAVING A DIFFERENT VALIDITY BIT FOR THE SAME DATA LINE

[75] Inventors: Theodore S. Robinson; Jeffrey A. Thomas, both of Cupertino; Robert A. Ertl; James P. Millar, both of Santa Clara; Ajay K. Shah, San Jose, all of Calif.

[73] Assignee: Amdahl Corporation, Sunnyvale, Calif.

[21] Appl. No.: 470,433

[22] Filed: Jan. 24, 1990

Related U.S. Application Data

[63] Continuation of Ser. No. 56,585, May 29, 1987, abandoned.

[51] Int. Cl.⁵ .................................................. G06F 12/00
[52] U.S. Cl. ........................................ 395/425; 395/800; 395/400; 364/DIG. 2; 364/964.2; 364/964.22
[58] Field of Search .................... 395/375, 800, 425

[56] References Cited

U.S. PATENT DOCUMENTS

| | | | |
|---|---|---|---|
| 3,581,291 | 5/1971 | Iwamoto et al. | 364/200 |
| 3,618,041 | 11/1971 | Horikoshi | 364/200 |
| 4,345,309 | 8/1982 | Arulpragasam et al. | 364/200 |
| 4,392,200 | 7/1983 | Arulpragasam et al. | 364/200 |
| 4,394,731 | 7/1983 | Flusche et al. | 364/200 |
| 4,445,174 | 4/1984 | Fletcher | 364/200 |
| 4,481,573 | 11/1984 | Fukunaga | 364/200 |
| 4,502,110 | 2/1985 | Saito | 364/200 |
| 4,527,238 | 7/1985 | Ryan et al. | 364/200 |
| 4,680,702 | 7/1987 | McCarthy | 364/200 |
| 4,701,844 | 10/1987 | Thompson et al. | 364/200 |
| 4,719,568 | 1/1988 | Carrubba et al. | 364/200 |

*Primary Examiner*—Thomas C. Lee
*Assistant Examiner*—L. Donaghue
*Attorney, Agent, or Firm*—Fliesler, Dubb, Meyer & Lovejoy

[57] ABSTRACT

The computer system architecture utilizes the ability to actively force a ghost line state in management of a split instruction and operand cache associated with an instruction unit with respect to a secondary system integrity cache tag store separately managed by a system controller. The split instruction and operand cache and the system controller tag store permit the management of multiple copies (line-pairs) of a memory line by storing address tag line pair state information with respect to each memory line present in the split-cache to allow determinations of whether and where the respective memory line pair members reside upon access of any one member. The architecture further includes a data path selector for transferring operand data to either the instruction or operand data cache buffers, or both, depending on whether the operand buffer destination is a memory line that is a member of a line pair. A ghost line state is forced whenever a modified memory line, existing as a member of a line pair is to be stored into the operand cache and a concurrent storage of the modified memory line in the instruction cache cannot be performed.

12 Claims, 2 Drawing Sheets

MICROPROCESSOR SYSTEM PRIVATE SPLIT CACHE TAG STORES WITH THE SYSTEM TAG STORE HAVING A DIFFERENT VALIDITY BIT FOR THE SAME DATA LINE

This application is a Continuation of Ser. No. 056,584, filed May 29, 1987, now abandoned.

CROSS REFERENCE TO RELATED APPLICATION

A related invention is disclosed in "Computer System Architecture Implementing Split Instruction and Operand Cache Line-Pair-State Management", by G. Woffinden et al., filed Oct. 17, 1986, Ser. No. 920,707, now U.S. Pat. No. 5,095,424, and assigned to the assignee of the present patent.

FIELD OF THE INVENTION

The present invention generally relates to cache memory based central processing unit (CPU) architectures as typically employed in high performance data processing systems and, in particular, to a split-cache based CPU architecture that provides for the efficient control and management of respective instruction and operand data caches.

BACKGROUND OF THE INVENTION

The fundamental purpose in providing a cache memory closely coupled to a central processing unit (CPU) is to enhance the rate that the CPU can receive instructions and operand data and return modified operand data. A cache memory is typically organized to store instructions and operand data as memory lines. Each such memory line may contain multiple instructions interspersed with their corresponding operand data. Since most high-performance CPUs are implemented using a pipelined, multiple-unit architecture, contentions may arise as competing instruction fetch and operand data transfers occur. Such contention occurs most often when both instructions and operand data cache memory accesses are concurrently attempted. The operand access request is normally given priority. Contention also arises whenever an instruction fetch attempt is made following an operand data fetch directed to the same memory line and where there is the possibility that the fetched operand data will be modified. The operand fetch typically locks, or makes private, the memory line until the potentially modified operand data can be returned. If the operand data has in fact been modified, the memory line into which it is stored must typically be written back to mainstore before the instruction fetch may be allowed to proceed as part of the public/private memory line management scheme.

A split-cache architecture is used to alleviate the contention for instructions and data residing in a single cache memory. The split-cache architecture described in the related application identified above further alleviates the throughput degradation that arises from the need to repeatedly write memory lines back to mainstore by tracking the storage of image copies of memory lines in separate instruction and operand data cache buffers. Management of identical memory lines stored in respective instruction and operand data buffers (a "line-pair") is permitted by storing a line-pair status bit and location pointer data in the system address and status information tag associated with each memory line kept in the split-cache. Potentially modified operand data memory lines that are a member of a line-pair are stored back to both the instruction and operand data memory line buffers in replacement of any prior image copy. Thus, with respect to its associated CPU, the split-cache essentially eliminates instruction/operand contention for memory lines stored in the cache.

Another source of cache memory line contention arises in multiple CPU data processing system architectures. Typically, a system controller is implemented to supervise and coordinate the overall operation of the multiple CPU system. Since separate CPUs may be operating on the same potentially modifiable operand data, a primary function of the system controller is to ensure that, at most, only one operand buffer contains a private copy of a memory line. Further, the system controller must operate to ensure that any request for a non-modifiable, public image of an operand data line is taken from the most recently modified version of that memory line wherever it exists in the data processing system. In conventional systems, the system controller is therefore required to access the operand buffer of every CPU's split-cache in order to determine whether and where any private copy of the requested memory line exists. Consequently, the system controller creates contention, resulting in a significant degree of CPU throughput degradation, whenever the system controller accesses or attempts to access the split-cache operand data buffer of any CPU.

One method of avoiding system controller contention for access to the operand data buffers of each of the split-caches is to provide a secondary system address and status information tag store. This secondary tag store is the cumulative equivalent of each tag store maintained as part of the respective split-caches within the data processing system. The system controller thus needs only to consult its secondary tag store to determine the public or private line state of any memory line present outside of mainstore. The secondary tag store is continuously updated by the system controller as it supervises each memory line transfer between mainstore and any CPU split-cache or between any set of CPU split-caches.

Unfortunately, a serious data integrity management problem arises as a result of relying on a secondary tag store rather than on the information contained in the primary tag store of each split-cache. Since the transfer of a memory line can be unexpectedly aborted at any time prior to finally updating a primary split-cache tag store, the system controller must update the secondary tag store synchronously with each and every split-cache memory line transfer or risk losing track of the actual existence of memory lines throughout the data processing system. This requirement places a severe constraint on the design of conventional data processing systems, particularly in terms of data processing throughput. The system controller needs to be able to reliably proceed with the processing of memory line transfer requests after initiating each one and before a prior initiated transfer necessarily completes. Therefore, the system controller must either contend for access to all of the split-cache memory line buffers in a verification process or implement some other mechanism for ensuring memory line data integrity throughout the multiple CPU data processing system.

SUMMARY OF THE INVENTION

Therefore, a purpose of the present invention is to provide a cache controller to operate a respective splitcache in a multiple CPU architecture computer system that operates to substantially decouple the tag integrity requirement as between each cache controller and a system controller that maintains a separate set of address tags.

This is accomplished in the present invention by the provision of a cache controller that manages the transfer of memory lines with respect to an instruction execution unit. Each memory line is assigned a corresponding system address. The cache controller includes a cache memory having a plurality of memory line and tag storage locations with each tag storage location providing for the storage of status information corresponding to a memory line. Also included is a controller for receiving a memory line having a predetermined system address and for either storing the memory line having the predetermined address in the cache memory or accessing the tag storage location corresponding to a memory line having the predetermined address preexisting in the cache memory and modifying the memory line status information associated with the preexisting memory line.

In implementing the basic capabilities of the present invention, an instruction and operand data (IF/OP) line pair bit is defined in the tag storage areas of both instruction and operand data caches. Additionally, the tag storage locations provide for the storage of sufficient information, either implicitly or explicitly to identify the respective data and instruction line locations within the instruction and operand cache memories for each memory line pair.

Thus, an advantage of the present invention is that it provides an efficient architectural mechanism for managing split-cache memories in a multiple CPU computer architecture while decoupling the management of the Tag 1 store of each split-cache and the system controller Tag 2 store. Therefore, no accesses of the Tag 1 store by the system controller are required in performing system integrity checks. Further, the operation of the cache controllers and the system controller are decoupled such that Tag 1 and Tag 2 may be separately updated and updated at differing times.

Another advantage of the present invention is that the management of the line pair state is simplified. Any error or other condition that prevents both members of a line pair to be updated can be handled as it occurs and entirely local by the cache controller. A ghost line-pair state is created by cancelling the line-pair status bit in Tag 1 only. Tag 2 therefore reflects the presence of a ghost line-pair until corrected some time later and without any immediate performance degradation.

A further advantage of the present invention is that its implementation is essentially independent of the number of CPU's present in the data processing system as a result of the centralized use of Tag 2 for data integrity searches.

Yet another advantage of the present invention is that, by making optimal use of existing architectural features of the data processing system, ghost line-pair states are corrected on an as needed basis and under such conditions that the system performance degradation is minimized to the point of being negligible while greatly simplifying design.

BRIEF DESCRIPTION OF THE DRAWINGS

These and other attendant advantages of the present invention will become apparent and readily appreciated a the same becomes better understood by reference to the following detailed description of the invention when considered in conjunction with the accompanying drawings, wherein like reference numerals designate like parts throughout the figures thereof, and wherein.

DETAILED DESCRIPTION OF THE INVENTION

Figure 1:
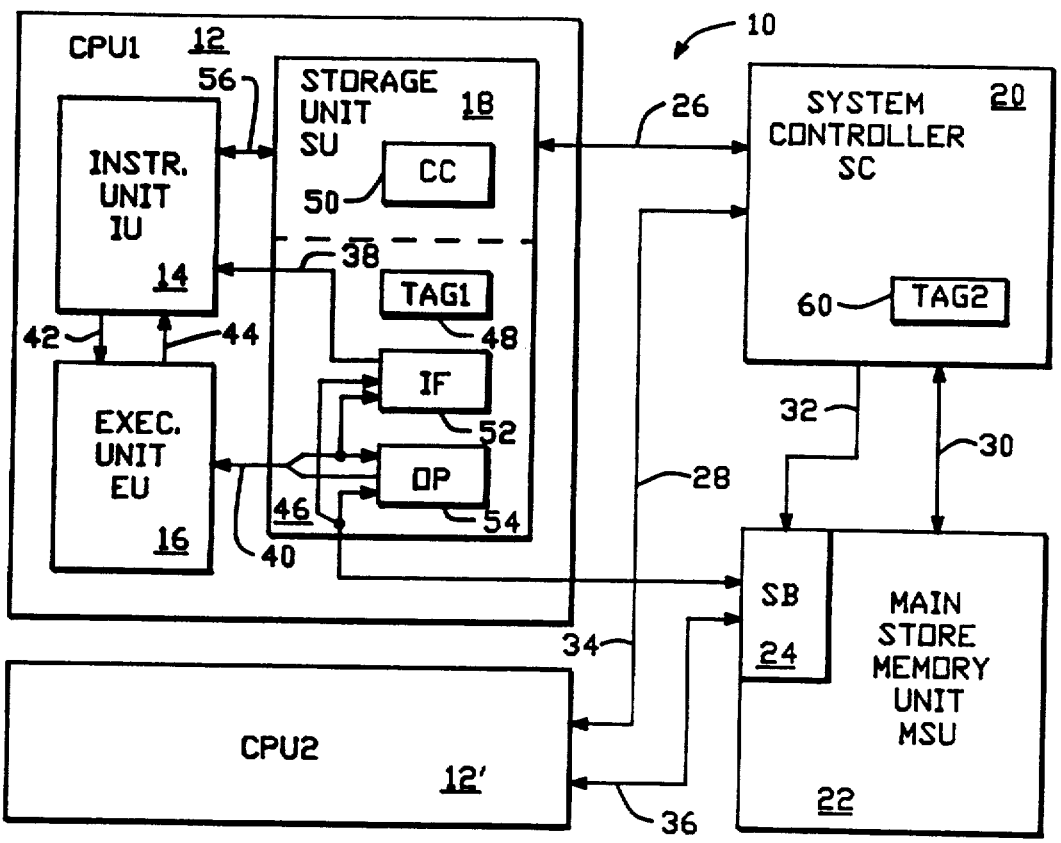
FIG. 1 is simplified block diagram of a split-cache. multiple CPU architecture data processing system incorporating a preferred embodiment of the present invention.

The principal elements of a preferred split-cache, multiple central processing unit (CPU) data processing system 10 are shown in FIG. 1. Included are a first CPU 12, an identical though optional second CPU 12', a system controller (SC) 20 and a mainstore memory unit (MSU) 22 with a closely allied memory line routing switch box (SB) 24.

The system controller 20 operates as the designated focal point for all system requests for access to the mainstore memory unit 22. Such requests are received by the system controller 20 via the request control lines 26 from the CPU 12. Other requests may be provided to the system controller 20 via the request control lines 28 from other elements of the data processing system 10 including, in particular, such as the second CPU 12'. Accordingly, the system controller 20 implements arbitration and control logic to orderly manage mainstore memory unit access requests and to supervise each resulting memory access by the application of mainstore control signals via the mainstore memory control lines 30.

A mainstore memory unit access typically involves the transfer of a full memory line to or from the mainstore memory unit 22. Each such memory line is composed of 64 bytes of data. All memory line transfers are dispatched through the switch box 24 by the system controller 20 based on route select control signals applied via the switch box control lines 32. As shown, the switch box 22 is connected to the two separate CPU's 12, 12' by the respective CPU memory line data busses 34, 36. The switch box 24 supports bypass transfer routing of memory lines between the CPU's 12, 12' as well as bidirectional memory line transfers with respect to the mainstore memory unit 22.

The preferred embodiment of the CPU 12 (and identically the CPU 12') includes an instruction unit (IU) 14, execution unit (EU) 16 and a storage unit (SU) 18 as its principal functional blocks. The instruction unit 14 implements a pipelined instruction processing function that provides for the segmented and staggered sequential execution of instructions generally in the sequence received via a CPU-internal instruction fetch bus 38. The execution unit 16 provides for the processing of operand data received via a CPU-internal operand data bus 40. The specific nature of the operand data processing function performed by the execution unit 16 is typically specified by and managed through the execution of respective instructions by the instruction unit 14.

That is, during the staged execution of each instruction, the instruction unit 14 provides execution unit control signals via the CPU internal execution unit control bus 42 to select and direct the corresponding processing of operand data accompanying or referenced by an instruction. In turn, execution result status signals derived from the processing of operand data are provided back to the instruction unit 14 via lines 44.

The storage unit 18 specifically functions to support the fetch and store requirements of the instruction and execution units 14, 16. For this purpose, a split-cache memory 46, including an address tag buffer (Tag 1) 48, and a cache controller (CC) 50 are provided as component elements of the storage unit 18. The split-cache memory 46 provides for the temporary storage of mainstore memory lines in an instruction buffer (IF) 52 and an operand buffer (OP) 54. The Tag 1 buffer 48 stores the address tag associated with each memory line present in the split-cache 46. Requests from the instruction unit 14 for instructions, each identified by address, are presented to the storage unit 18 via an instruction request bus 56. Requests to receive or store operands, also identified by address, are placed on behalf of the execution unit 16 by the instruction unit 14. The storage unit 18 initially responds to each such request by invoking the cache controller to determine whether the request can be satisfied by an immediate access of either the instruction or operand buffer 52, 54. In general, the cache controller 50 makes this determination based on an examination of the address tags currently stored in the Tag 1 buffer 48. If a request cannot be immediately satisfied by an instruction or operand buffer access, the request including the address of the requested instruction or operand is passed by the lines 26. In general, a mainstore memory line containing the requested instruction or operand is then accessed and returned from the mainstore unit 22 via the switch box 24 under the cooperative control of the storage unit 18 and system controller 20 by way of the first CPU data bus 34. The memory line returned is generally stored in either the instruction or operand buffer 52, 54 of the split-cache memory 46 depending on whether the request was originally for an instruction or an operand. The address tag accompanying the returned memory line is stored in a logically corresponding location within the Tag 1 buffer 48.

In the preferred embodiment of the present invention, the instruction and operand data buffers 52, 54 and the Tag 1 buffer 48 are implemented in high-speed memory. The instruction buffer 52 provides for the set associative storage of 256 memory lines of 64 bytes in each of two instruction buffer memory banks. Similarly, the operand buffer 54 provides for the set associative storage of 512 memory lines in each of two operand buffer memory banks. The memory banks in each pair of buffer memory banks are respectively identified as A and B associativities.

The Tag 1 buffer 48 is implemented as a set associative memory physically as well as logically corresponding to the instruction and operand buffers 52, 54. That is, the Tag 1 buffer 48 is implemented with an address tag storage location corresponding to each of the possible 1,536 split-cache stored memory lines. Each of these 1,536 Tag 1 buffer storage locations provides for the storage of a full memory line address tag, including the system address and control data associated with the memory line. This control data is used principally for the management of the memory line while present outside of the mainstore unit 22.

The entire split-cache 46 is operated as part of a virtual cache system utilizing a virtual or effective addressing scheme as opposed to conventional real or system address cache systems. For purposes of the present invention, the effective address of a memory line when present in either the instruction or operand buffer 52, 54 is simply its cache address. System address bits <SA26:31> provide sufficient address definition to uniquely specify any byte in a single 64 byte memory line. Based on the memory line storage requirements of the instruction and operand buffers 52, 54, any memory line in the cache buffers can be uniquely specified by effective address bits <EA17:25>; the combined address of EA17:25 and SA26:31 uniquely specifying a single split-cache stored byte. Effective address bit <EA17>, however, is only required with respect to the operand buffer 54, given that the operand buffer 54 stores twice as many memory lines as the instruction buffer 52. Table I illustrates the relationship between system and effective addresses for purposes of the present invention.

TABLE I

| Cache or Effective | Addressing Scheme System | Description |
|---|---|---|
| — | SA<3:19> | Page Address |
| SU1/2 | — | SU Select |
| OP/IF | — | OP/IF Select |
| A/B | — | Associativity |
| EA<17:25> | — | Cache address/ Tag Index |
| EA<20:25> | SA<20:25> | Line in Page Index |
| EA<26:31> | SA<26:31> | Byte in Line Index |

Figures 3, 4A, 4B:
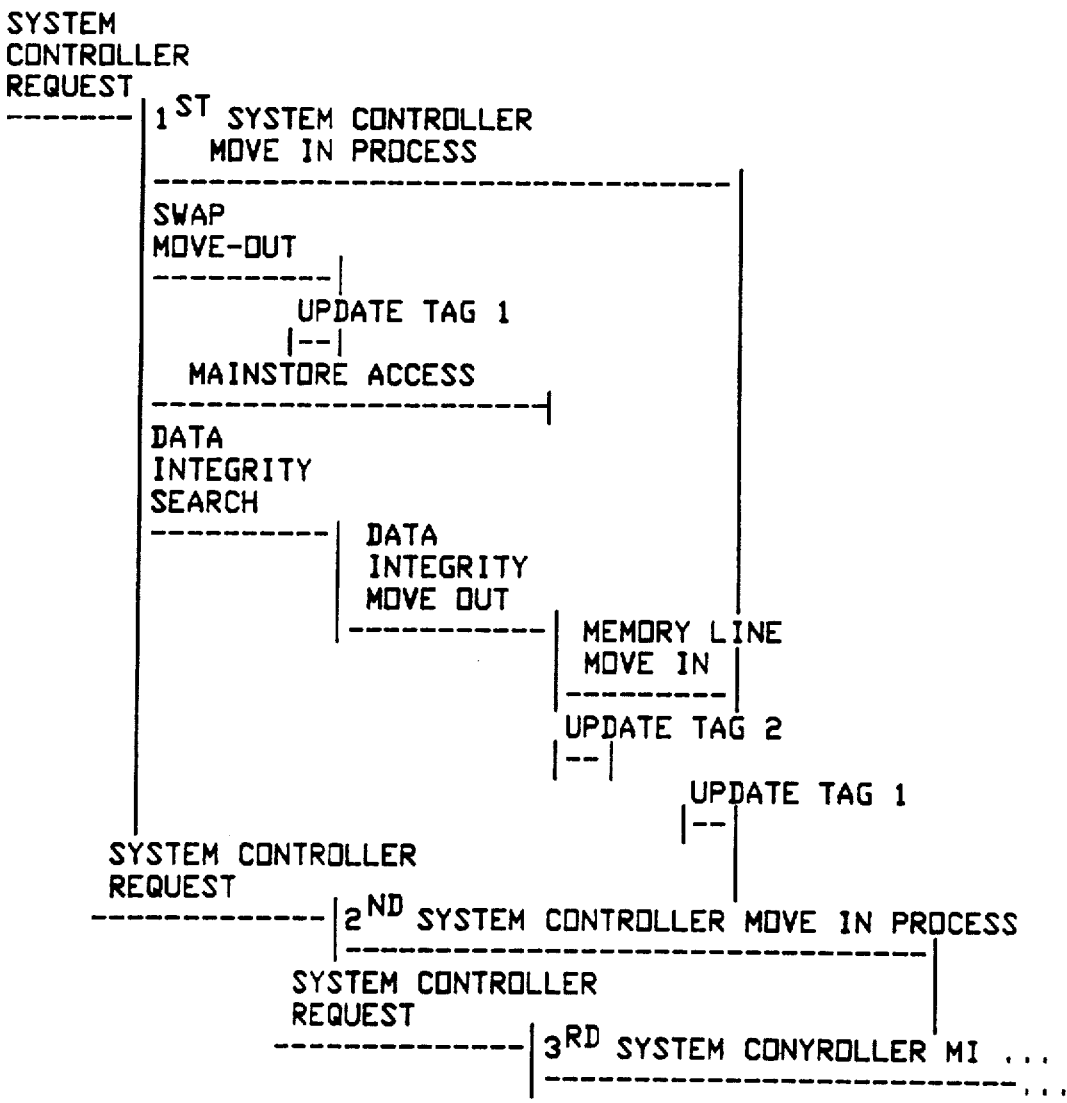
FIG. 3 is a process flow diagram illustrating a data move-in process.
FIGS. 4a and 4b illustrate the tag storage hit fields of the Tag 1 instruction and operand data cache tags. respectively.

Table II and FIGS. 4a and b summarize the principal address and control fields of a memory line address tag as stored in the Tag 1 buffer 48.

TABLE II

| Tag 1 Address Tag Fields | #Bits |
|---|---|
| Implied | |
| Tag Index<EA17:25> | — |
| IF/OP Associativity | — |
| Explicit | |
| System Address<SA3:19> | 17 |
| Tag Valid | 1 |
| IF/OP Line Pair | 1 |
| IF/OP Pair Associativity | 1 |
| EA17 of OP Pair | 1* |
| Public/Private | 1** |
| OP Line Modified | 1** |

*Used only for IF address tags
**Used only for OP address tags

Although full system addresses are 32 bits long (bit <SA0> being the most significant bit), the Tag 1 address tags need explicitly store only system address bits <SA3:19>. Entire memory lines are stored by the Tag 1 buffer 48 thereby obviating the need to explicitly store a memory line's in-line byte identifying bits <SA26:31> as part of the address tag. In addition, the tag index and associativity bit need not be explicitly stored. Sets of Tag 1 storage locations are logically mapped to associativity sets of either instruction or operand buffer storage locations. An address tag is stored in one of a set of Tag 1 buffer locations uniquely corresponding to the associativity set of memory line storage locations that store its memory line. Both the address tag and its memory line are stored in the same associativity of their respective Tag 1 and instruction or operand buffers, 48, 52, 54. In storing a memory line into the cache 46, the choice of an associativity set of memory line storage locations is based on the tag index bits <EA17:25> of the line being stored. The address tag is stored in the same tag index and associativity referenced storage location in either the instruction or operand portion of the Tag 1 buffer. Thereafter, the tag index and associativity of that or any other memory line in the split-cache 46 can be directly determined from the buffer relative storage location of its associated address tag within the Tag 1 buffer 26.

The remaining control data fields maintained as part of a Tag 1 address tag include tag valid, line pair, public/private and modified data bits. The tag valid bit indicates whether the current address tag and its associated memory line are valid. If the associated memory line occurs in the operand buffer 54, then the public/private bit determines whether the CPU 12, 12' has private (read/write access) privileges to that particular memory line while present in its local cache 46. The modified memory line bit flags whether the memory line has indeed been modified by a write access.

The line pair bit of the Tag 1 address tag is used to indicate whether a memory line is duplicated in the complementary buffer of the split-cache 46. That is, in accordance with the present invention, an instruction and a private operand copy of a single memory line can be simultaneously present and properly managed in the split-cache 46 under certain conditions. In general, these conditions include that the two memory line copies exist in the respective instruction and operand buffers 52, 54 of a single split-cache 46, both memory lines must have the same system address and both memory lines have the same tag index. A pair of memory lines in a split-cache 46 meeting these conditions is defined as a line pair. The line pair bit is set in the address tags of both memory line members of the line pair. Since memory lines having the same tag index need not be stored in the same associativity of the instruction and operand buffers 52, 54, an additional pair associativity bit is maintained explicitly in each address tag to identify the associativity of the other member of the line pair. A copy of the effective address bit EA17 is also kept in the address tags of instruction memory line pair members. The tag index of instruction memory lines is fully specified by effective addresses <EA18:25> with the state of EA17 being undefined. Thus a copy of the effective address bit <EA17> must be kept to allow the unique identification of the operand member of the line pair based on only bits <EA18:25> of the instruction's tag index.

The management of line pairs follows the following rules: copy of a public (read access only allowed) memory line can exist in each of the buffers 52, 54 of the CPU's 12, 12'; only a single copy of a private (write access privileged) memory line can exist in any one of the operand buffers 54 of the CPU's 12, 12' (instruction buffer memory lines always being held public); and a line pair of a specific memory line can exist in any one split-cache 46 where the line pair members are stored in the respective instruction and operand buffers 52, 54 and where the operand buffer member of the line pair is held with private access privileges. Whenever these management rules and conditions are or will be met with regard to two copies of a single memory line, a line pair is created. The address tag of each member of the pair is updated to reflect its status as a member of a line pair and to include the associativity and, if necessary, the operand effective address bit <EA17> of its pair member. Thus, any number of line pairs of different memory lines may exist in the split-caches 46 of the CPU's 12, 12' of the data processor 10. So long as the rules and conditions for the existence of line pairs continue to be met, the line pairs will remain intact. If a condition or rule fails, the line pair state will be destroyed. That is, the respective address tags of the line pair are accessed and their line pair bits are reset and marked public or marked invalid. For example, if a line pair is held in the split-cache 46 of the first CPU 12 and the system controller 20 receives a CPU 12' request for the same memory line but with private access privileges and the operand member of the line pair has not been modified, both copies of the line pair are simply invalidated during the course of the data integrity function carried out by the system controller 20 prior to transferring a new copy of the requested private memory line to the CPU 12'. A request for the memory line with public access privilege by the second CPU 12' is handled differently only to the extent that the line pair status of both line pair address tags are reset and the operand address tag is marked public. If, however, the operand member of the line pair held by the split-cache 46 of the first CPU 12 has been modified then the data integrity function of the system controller 20 will perform a data integrity move-out (DIMO) of the modified memory line for storage in the mainstore 22 prior to marking both members of the line pair invalid in the split-cache 46 of the CPU 12. If, then, the second CPU 12' makes a subsequent move-in request of the system controller 20 for the same memory line with respect to its instruction buffer 52, the system controller 20 will create a line pair in the split-cache 46 of the CPU 12' upon move-in of the requested instruction memory line. The creation of the line pair is achieved by updating of the address tags of both members of the new line pair. Finally, if the second CPU 12' makes another unrelated request of the system controller 20 for the move-in of a memory line having the same tag index as one member of a line pair already present in its split-cache 46, though having a different system address, the system controller 20 will destroy the existing line pair in performing its data integrity function. If the destination of the requested memory line is the operand buffer 54 and the operand member of the line pair has been modified, an operand memory line swap move-out is performed. In any case, the address tags of the line pair are then accessed, both line pair bits are reset and the move-in destination buffer line pair member is marked invalid. If the destination buffer is the instruction buffer or the operand line pair member has not been modified, the system controller 20 performs only the data integrity tag access operation, or short move-out. The requested memory line move-in is then performed with another access of the corresponding memory line address tag to mark it valid and to write the new system address and other control data to fully reflect the presence of the newly moved-in memory line.

The management of line pair states throughout the data processing system 10 is cooperatively handled by the storage unit 18 of both the CPU's 12, 12' and the system controller 20. In order to obviate the need to query the Tag 1 buffers 48 of the CPU's 12, 12' in response to every memory line request, the system controller 20 implements its own address tag (Tag 2) buffer 60. The Tag 2 buffer 60 contains a number of Tag 2 address tag storage locations equal to the combined number of storage locations in the Tag 1 buffers 48 of the CPU's 12, 12'. Table III summarizes the Tag 2 address tag fields maintained for each address tag location within the Tag 2 buffer 60.

TABLE III

| Tag 2 Tag Fields | #Bits |
|---|---|
| Implied | |
| SU Identifier | — |
| Tag Index <EA17:25> | — |
| IF/OP Associativity | — |
| Explicit | |
| System Address<SA3:19> | 17 |
| Tag Valid | 1 |

The physical structure of the Tag 2 buffer 60 allows the Tag 2 address tag storage locations to be logically mapped to the respective Tag 1 buffer storage locations for both Tag 1 buffers 48 of the CPU's 12, 12'. By design, the system controller 20 stores its Tag 2 address tag within the Tag 2 buffer 60 at the logically corresponding location as the Tag 1 address tag is stored by either cache controller 50 in its associated Tag 1 buffer 48 of either CPU 12, 12'. Consequently, the storage unit identifier, tag index and associativity are all directly implied by the specific location where an address tag is stored in the Tag 2 buffer 60.

The explicit storage requirements of the Tag 2 buffer 60 is therefore limited to the system address <SA3:19> of the address tags corresponding memory line, one bit to indicate whether the tag is valid and one bit to indicate whether the memory line is being held with either public or private access privileges.

A typical request made to the system controller 20 is for a memory line move-in (MI). Given that the split-cache buffers 52, 54 of the requesting CPU are typically always nearly full, a request for a move-in of yet another memory line will require the prior swap move-out (MO) of a memory line to make room for the requested move-in memory line. The swap move-out line is the memory line currently occupying the buffer storage location that is to be the destination of the move-in requested memory line. Table IV summarizes the request information presented to the system controller 20 as part of a move-in request.

TABLE IV

| Move-In Request | #Bits |
|---|---|
| Move In Op Code | 8 |
| SU Identifier (implied) | — |
| System Address<SA3:19> | 17 |
| IF/OP Memory Line Request | 1 |
| Associativity | 1 |
| Tag Index<EA17:25> | 9* |
| Public/Private | —+ |
| Swap Public/Private | 1# |
| OP Line Modified | 1# |
| IF/OP Line Pair | 1# |
| IF/OP Pair Associativity | 1# |
| EA17 of OP Pair | 1#** |

— Part of the Op Code
*Only EA18:25 if an IF Line Request
**Only used for IF Line Requests
Swap move-out replacement control data The move-in Op Code directs the system controller 20 to perform a move-in process. FIG. 3 summarizes the system controller process that is invoked in response to a move-in Op Code request.

By the implementation of the preferred embodiment of the present invention, the system controller 20 is able to independently identify the source of each request. Thus, the storage unit identifier is implied. The move-in request explicitly identifies the move-in requested memory line by providing its system address <SA3:19> and tag index <EA17:25>. In addition, the request indicates whether the memory line destination is to be the instruction or operand buffer 52, 54 and whether public or private access privilege to the memory line is requested. From this essential move-in information, the system controller is able to uniquely identify the memory line that must be swap moved-out prior to the requested memory line being moved-in.

To facilitate the swap move-out, the requesting storage unit 18 also provides, as part of its move-in request, control information regarding the swap move-out memory line. The public/private privilege and modified bits of the memory line to be swap moved-out are provided to allow the system controller 20 to determine whether a long or a short operand memory line swap move-out need be performed. If the swap move-out memory line is located in the instruction buffer 52, the move-out is always effected by a short move-out to mark the instruction memory line as being invalid in the instruction Tag 1 buffer. Additionally, the line pair, pair associativity and pair EA17 bits are provided so that the system controller 20 can locate and update the address tag of the remaining line pair member at the end of either the long or short swap move-out to reset its line pair state bit.

Given the information contained in the move-in request, the system controller 20 initiates the required memory line swap move-out from the requesting storage unit 18 as soon as the request is received and accepted. Table V summarizes the request information presented to the system controller 20 to initiate the swap move-out.

TABLE V

| Swap Move-Out Request | #Bits |
|---|---|
| Swap Move-Out Op Code | 8 |
| IF/OP Memory Line | —+ |
| Long/Short | —+ |
| Associativity | 1 |
| Tag Index <EA17:25> | 9* |
| IF/OP Line Pair | 1 |
| IF/OP Pair Associativity | 1 |
| EA17 of OP Pair | 1** |

+ Part of the Op Code
*Only EA18:25 if an IF Line Request
**Only used for IF Line Requests The swap move-out request Op Code identifies for the cache controller 50 whether to the move-out memory line is in the instruction or operand buffer, whether it is part of a line pair and whether to perform a long or short move-out with respect to the operand memory line if it is to be moved-out.

A mainstore access is also initiated immediately to begin the process of obtaining the requested move-in memory line. The data integrity function of the system controller 20 is also simultaneously invoked. That is, a data integrity (DI) search of the address tags in the Tag 2 buffer 60 is performed to determine whether and where any copies of the requested memory line exist outside of the mainstore unit 22. The entire data integrity search of the Tag 2 buffer 60 is completed in a sequence of four search cycles. The physical structure of the Tag 2 buffer 60 and the search circuitry allows simultaneous access to one address tag location for each combination of storage unit, instruction buffer, operand buffer (including both EA17 halves), and associativities during each search cycle. The search location is defined by the effective address bits <EA18:25> of the move-in request. Since effective address bits <EA20:25> are the same as system address bits <SA20:25> the search location within the Tag 2 buffer 60 is known for these bits <EA20:25> for purposes of the data integrity search. However, virtual address synonyms may exist with respect to effective address bits <EA18:19>. Thus, all synonyms of the requested memory line are checked in the Tag 2 buffer 60 by incrementing the value of effective address bits <EA18:19> after each data integrity search cycle beginning with the EA18:19 value provided with the move-in request. The search results returned at the conclusion of each data integrity search cycle for each of the locations within the Tag 2 buffer 60 searched is summarized in Table VI. During each Tag 2 search cycle, the system address <SA3:19> is compared to that of every Tag 2 address tag accessed. A match occurs whenever the two system addresses compare equal. If two matching memory lines are found that further meet the conditions and rules for the existence of a line pair, the system controller 20 assumes that the memory lines are in fact members of a line pair.

TABLE VI

| DI Search Results | |
|---|---|
| DI Match Result Fields | #Bits |
| Implied | |
| Matching Line Found | — |
| Member of a Line Pair | — |
| Explicit | |
| SU Identifier | 1 |
| IF/OP Associativity | 1 |
| OP EA17 | 1* |
| Potential Line Pair Make on MI | 1 |

*Used only in OP Tag 2 Matches

With each data integrity search match in the Tag 2 buffer 60, the system controller 20 is able to identify the unique storage location of the matching memory line in either of the split-caches 46 of the CPU's 12, 12'. In general, the system controller 20 initiates a data integrity move-out (DIMO) with respect to each matching memory line found as a consequence of the data integrity search. That is, for each copy of the move-in requested memory line found during the Tag 2 buffer search, the system controller 20 itself places a data integrity move-out request back to the storage unit 18 that contains a found memory line copy. Table VII summarizes the information provided to a storage unit 18 as part of a data integrity move-out request.

TABLE VII

| DI MO Request | #Bits |
|---|---|
| DIMO Op Code | 8 |
| IF/OP Memory Line | —+ |
| Long/Short | —+ |
| System Address <SA3:19> | 17 |
| Associativity | 1 |
| Tag Index <EA17:25> | 9* |
| IF/OP Line Pair | —+ |
| IF/OP Pair Associativity | 1 |

TABLE VII-continued

| DI MO Request | #Bits |
|---|---|
| EA17 of OP Pair | 1** |

—Part of the Op Code
*Only EA18:25 if an IF Line Request
**Only used for IF Line Requests The information provided as part of the data integrity move-out request is essentially that necessary for the storage unit 18 receiving the request to identify a unique memory line within its split-cache 46. The data integrity move-out request 0 Code identifies for the cache controller 50 whether the move-out memory line is in the instruction or operand buffer and whether it is to be treated as part of a line pair. Normally, the Op Code will specify a long move-out with respect to an operand memory line if it is held private. Otherwise, short move-outs are specified. The type of the data integrity operand move-out actually performed is qualified by the cache controller 50 based on whether the identified memory line has been modified as determined from an access of the corresponding Tag 1 buffer address tag. That is, a long move-out will be requested by the system controller 20 for a private operand memory line. A long move-out is performed if the memory line has been modified. Conversely, if a long move-out of an unmodified operand memory line is requested, the cache controller 50 issues an abort long move-out signal to the system controller 20 and performs a short move-out. In any case, the address tag of the memory line identified by the data integrity move-out request is accessed and marked invalid (long move-out) or public (short move-out). If the data integrity move-out Op Code indicates that the move-out memory line is a member of a line pair, the companion line pair member is simultaneously moved out. Whether the move-out of the companion line pair member is long or short is determined by the system controller 20 as qualified by the cache controller 50. Depending on the type of move-out actually performed on the companion line pair member, its Tag 1 address tag is accessed and marked either public or invalid. Regardless, the line pair bit of both address tags of the line pair are reset in the Tag 1 buffer 48.

In accordance with the present invention, one exception exists in the performance of data integrity move-outs. In performing the data integrity search of the Tag 2 buffer 60, the system controller 20 determines whether a proper line pair could be created on move-in of the requested memory line. That is, if the data integrity search of the Tag 2 buffer 60 finds a matching memory line held in the complimentary instruction or operand buffer 52, 54 of the original move-in memory line requesting CPU 12, 12', the system controller 20 will recognize the potential for creating a line pair by the move-in of the requested memory line. The system controller 20 will therefore not perform a data integrity move-out with respect to this potential line pair memory line. Instead, the system controller 20 will defer action until the move-in memory line address tag is accessed in the Tag 1 buffer 48. At that time, the system controller 20 will update the address tag of the preexisting line pair member to establish the necessary information to indicate that the preexisting and move-in lines now present in the instruction and operand buffers 52, 54 are mutual members of a line pair.

After all data-integrity move-outs have been completed, the system controller 20 provides the requested move-in line to the storage unit 18 that originally placed the move-in request with the system controller 20. The information provided to the storage unit 18 by the system controller 20 to initiate the actual move-in of the requested memory line is summarized in Table VIII.

TABLE VIII

| MI Line Request | #Bits |
|---|---|
| Move In Op Code | 8 |
| System Address <SA3:19> | 17 |
| IF/OP Memory Line | 1 |
| Associativity | 1 |
| Public/Private | 1 |
| Tag Index | 9* |
| Create IF/OP Line Pair | 1 |
| Line Pair Associativity | 1 |
| OP Pair EA17 | 1** |

*Only 8 bits <EA18:19> if an IF MI
**Only used for IF MI

Since the storage unit 18 will likely have been involved in other storage unit related operations while awaiting the return of its move-in requested line, the system controller essentially repeats the original move-in line request to provide the necessary information for the storage unit 18 to uniquely identify the memory line being moved-in, where it is to be stored in the split-cache 46 and whether and where a line pair is to be created. At the same time the system controller issues its version of the move-in line request, the mainstore unit 22 typically begins providing the requested move-in memory line via the switch box 24 and the appropriate one of the CPU mainstore data lines 34, 36 as selected by the system controller 20 via control lines 32. Accordingly, the storage unit 18, on receipt of the system controller move-in line request, immediately begins accepting the move-in memory line. In the preferred embodiment of the present invention, the memory line is transferred in four cycles of 16 bytes each. During the fourth move-in data transfer cycle, the move-in and any preexisting line pair member address tags are written and updated, respectively.

Figure 2:
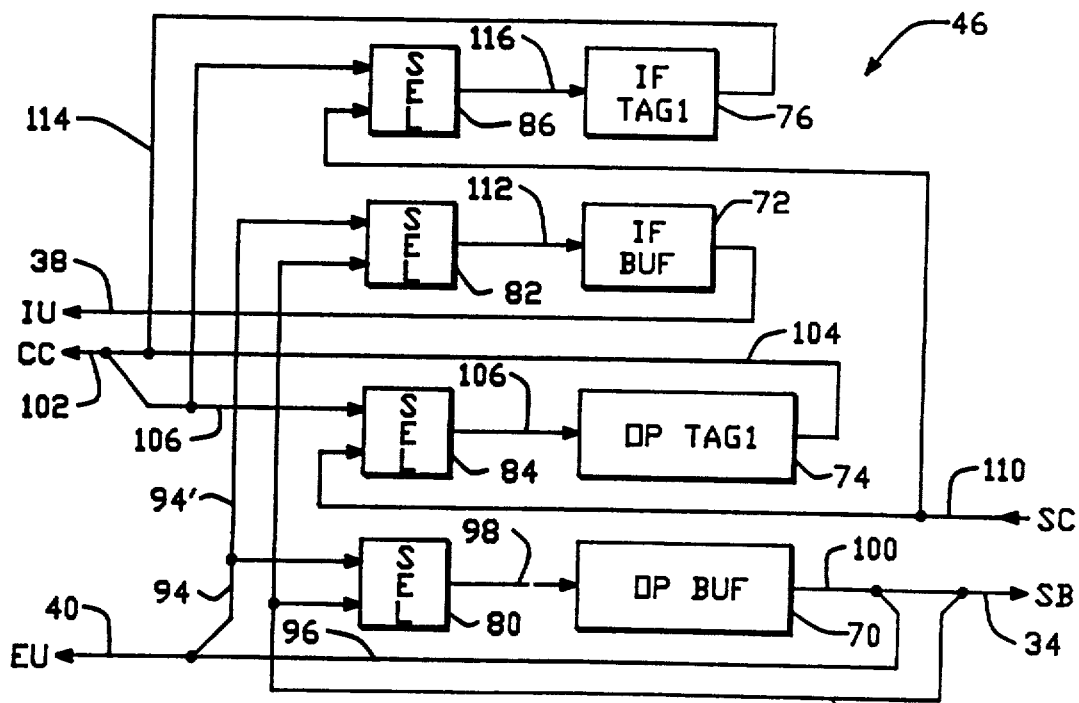
FIG. 2 is a detailed block diagram of a split instruction and operand cache constructed in accordance with a preferred embodiment of the present invention.

Referring now to FIG. 2, the data paths and principal elements of the split-cache 46 are shown. A memory line destined for the operand buffer 70 is received from the CPU memory line data bus 34 onto an internal memory line input bus 90 as one of two inputs to a selector 80. A second input to the selector 80 is from the execution unit 16 via the CPU-internal operand bus 40 and operand return bus 94. Upon receiving a system controller memory line move-in request, the cache controller 50 further provides the IF/OP selection, tag index and memory line associativity of the move-in request to the instruction and operand buffers 70, 72 to select a unique memory line destination storage location. That is, if the IF/OP selection made by the move-in request specifies that the memory line provided onto the internal memory line input bus 90 is destined for the operand buffer 70, the cache controller 50 configures the selector 80 to pas the memory line data present on the memory line input bus 90 to the operand buffer 70 via the selector output bus 98. For an instruction buffer destined memory line, the cache controller will instead configure a selector 82 to pass the memory line to the instruction buffer 72 via the selector output data bus 112 for storage in the tag index and associativity designated storage location.

During the fourth and final memory line transfer cycle of the move-in, the cache controller further configures one or both of the Tag 1 selectors 84, 86 for the updating of the instruction and operand address tags. The necessary Tag 1 update information is provided by the system controller as part of the system controller move-in request via control lines 110 (a subset of the system controller control lines 26). Specifically, the choice to configure both selectors 84, 86 for address tag access is based on the create line pair bit of the system controller move-in request. The system address, public/private, tag valid and line pair related tag update information is received from the system controller 20 by the selectors 84, 86 for their respective instruction and operand Tag 1 buffers 74, 76. The storage location of the address tags to be updated is obtained by the cache controller 50 from the system controller 20 move-in request provided information and applied to the selection of a memory line storage location in the instruction and operand buffers 70, 72. The address tags thus written, if for a line pair, are largely identical, though differing in that they are written with complimentary information identifying the location of their pair member location in the instruction or operand buffers 70, 72.

The split-cache 46 supports the reading of partial memory lines (double word) from the instruction buffer 72 in response to an instruction fetch request by the instruction unit 14. Similarly, partial memory lines are transferred to or from the operand buffer 70 either as part of a memory line move-out or the transfer of operands to the execution unit 16. For an instruction fetch, the requested instruction is extracted from the partial instruction memory line as obtained from the instruction buffer 72, aligned and then provided to the instruction unit 14 via the CPU-internal instruction bus 38. For a memory line move-out, the operand buffer 70 acts as a source of four 16-byte data transfers occurring in four data transfer cycles. The cache controller 50 effectively transfers the quarter-memory line segments onto the CPU memory line data bus 34 by way of the operand buffer output data bus 100. Conversely, where operands are being read from the operand buffer 70 to the execution unit 16, double word operands are transferred onto the CPU-internal data bus 40 via the operand output data bus 96.

With the return of operands from the execution unit 16, the cache controller performs an update operation on the address tag corresponding to the operand data returned to the operand buffer 70. That is, the selector 84 is configured by the cache controller to pass address tag update information provided by the cache controller, via cache control tag lines 102, to an input 106 of the selector 84 at the sam time the execution unit operand data is returned to the operand buffer 70. The operand memory line Tag 1 address tag is generally updated simply to mark the memory line receiving the operand as having been modified.

In accordance with the present invention, operands originated o modified by the execution unit 16 may also be written back to the instruction buffer 72 at the same time they are written into the operand buffer 70. Normally, only complete memory lines are written into the instruction buffer 72 in response to an instruction memory line move-in request issued to the system controller 20. However, where a line pair exists in the split-cache 46 and the operand buffer member is written to with operand data from the execution unit 16, the present invention provides for the instruction buffer resident member of the line pair to be equivalently modified. Accordingly, the cache controller 50 configures the selector 82 to write modified operand data to a memory line pair member present in the instruction buffer 72 simultaneous with the writing of the same operand data to the corresponding memory line pair member in the operand buffer 70. As before, the cache controller 50 updates the corresponding memory line address tag present in the operand Tag 1 buffer 74 to indicate the modified status of the operand memory line. The address tag of an instruction memory line of a line pair need not be correspondingly accessed, since the Tag 1 modified data bit for an instruction memory line is not defined and no other address tag information need be updated.

In the preferred embodiment of the present invention, the operand data lines 94' are limited data width such that only operands that are less than 8 bytes wide or 8 bytes half word aligned can be written from the execution unit 16 to a memory line stored in the instruction buffer 72. Execution unit operands of up to 32 bytes, aligned or unaligned, can be written to a memory line in the operand buffer 70. Where a operand returned by the execution unit 16 is not capable of being written into the instruction buffer 72 via data bus lines 94', the cache controller 50 instead invalidates the instruction buffer line pair member during the otherwise normal update access of the instruction Tag 1 buffer 76. The update operation performed on the address tag of the operand Tag 1 buffer 74 to change the state of the modified bit will further reset the operand IF/OP line pair state bit if the instruction line pair member is invalidated. Thus, the line state pair status is effectively destroyed and the instruction line pair member invalidated, though the operand memory line continues to validly exist in the operand buffer 70.

An operand store invalidation of the instruction Tag 1 address tag without any notice to the system controller 20, however, creates the potential for a line pair inaccuracy to subsequently occur as between the instruction and operand Tag 1 address tags. Such a condition is defined as a ghost line pair state. That is, the operand address tag will reference a nonexistent or ghost instruction address tag as a mutual member of a line pair.

This ghost line pair state can arise if the system controller 20 moves-in the operand line pair member after an operand store invalidation of the line pair companion memory line, but without an intervening operand Tag 1 address tag invalidation or move-in into the instruction buffer 72 at the instruction line pair tag index and associativity. For this to occur, following the instruction address tag invalidation, another CPU 12' must request the operand memory line with only public privileges and the system controller 20 must only update the operand Tag 1 address tag as now being held public. The operand memory line must then be requested back by the CPU 12, again with private privileges. In making the required move-in, based on the contents of the Tag 2 buffer 60, the system controller 20 will perform a short move-in updating the Tag 1 address tags of both the still invalid instruction and operand memory lines to indicate that they are mutual members of a line pair; the ghost line pair is thus created. No check is made as to whether the instruction Tag 1 address tag is marked invalid. However, this seeming error in the management of line pair states does not result in any degradation of the operation of the split-cache 46. The instruction and operand Tag 1 buffers 74, 76 remain accurate with respect to the memory lines actually contained in the respective instruction and operand memory line buffers 70, 72. That is, requests for instructions or operands by the instruction and execution units 14, 16 are handled by the storage unit 18 based on respective cache controller searches of the instruction and operand tag 1 buffers 74, 76. Such cache controller searches do depend on the Tag 1 address tag valid bit and are therefore independent of the presence of a ghost line state.

The ghost state is tolerated even where the remaining valid operand memory line of the ghost line pair is again accessed for the storage of an execution unit modified operand. The modified operand is, as before, simultaneously written to the memory line member in the instruction buffer 72, even though it exists as a ghost line. This blind update of the instruction Tag 1 buffer is a consequence of the line pair marked address tag present in the operand Tag 1 buffer 74 indicating the presence of the instruction memory line member of the pair. The cache controller 50 does not update the address tag of the invalid memory line present in the instruction buffer 72 where the store of the operand data to the instruction buffer 72 is possible. Where the operand instruction buffer store cannot be made due to the instruction buffer access limitation of the data bus 94', the subsequent access of the instruction Tag 1 buffer 96 merely invalidates the already invalid instruction buffer address tag.

Notably, the ghost member of a ghost line pair is always invalid. If an instruction memory line move-in request is completed with respect to the same tag index instruction storage location as the ghost, a valid line will exist there. The moved-in memory line can be either the same memory line as the ghost memory line or another memory line having the same tag index. If the memory line is the same as the ghost, then the line pair validly exists. Subsequent operand writes to an instruction line pair member are proper. Conversely, if a different memory line is moved-in, then the line pair bit of the operand address tag will have been corrected during the swap move-out process invoked in response to the instruction move-in request. That is, the original move-in request identifies the ghost instruction memory line for swap move-out, independent of the line being invalid. The system controller 20 responds by requesting the instruction move-out, including the identification of the ghost memory line as a member of a line pair. As before, the cache controller simply invalidates the instruction memory line by an update of its instruction Tag 1 address tag. Also, based on the line pair identification of the swap move-out line, the operand Tag 1 address tag is accessed specifically to reset the operand address tag line pair bit.

The principles of the present invention are not limited to computer systems that utilize split-cache architectures. Data integrity management involving the use of ghost memory-line states, in accordance with the present invention, can be advantageously applied to any computer system employing separate CPU and system controller cache tag stores.

A ghost memory line may be created whenever a memory line is transferred to a CPU cache and the move-in of the memory line fails to properly complete. While the circumstances of such a failure are many, the general corrective action is to abort the move-in. Accordingly, the CPU cache Tag 1 store is not updated. The Tag 1 store therefore continues to properly reflect the immediately prior contents of the Tag 1 store. Typically, the Tag 1 store will continue to show that an invalidated copy of a memory line, due to a swap move-out where the move-out succeeded and the move-in failed, is present in the CPU cache memory at the target storage location of the aborted move-in. Since Tag 2 is not updated in response to the move-out, a ghost memory line is created. This ghost memory line will be corrected, in accordance with the present invention, when the CPU subsequently requests the memory line for which the prior move-in failed. That is, the CPU cache controller will again attempt to obtain the memory line by generating a corresponding move-in request directed to the system controller. On ultimate successful completion of the requested move-in, both Tag 1 and Tag 2 are updated to eliminate the ghost state.

Another circumstance properly managed by the creation of a ghost line is when an uncorrectable ECC ("Error Correction Code") error occurs during a memory line move-in to a CPU cache from, typically, mainstore. The uncorrectable nature of the ECC error is nominally determined only after the memory line has been stored in the CPU cache. The cache controller, in accordance with the present invention, simply marks the moved-in memory line tag as being invalid during the update of the Tag 1 store. The result, again, is that a ghost line is created. However, as with an abort of a move-in operation, the subsequent normal operation of the CPU and cache controller will correct the ghost line state.

In each of these circumstances, the utilization of the present invention, and the allowance of the existence of ghost states, directly operates to significantly reduce the required interaction between each of the cache controllers and the central system controller within a multiple CPU data processing system. The result is a reduction in the system design complexity and required degree of interaction between the system controller and the individual cache controllers.

Thus, a computer system architecture implementing a line-pair state in management of split instruction and operand caches and that utilizes an ability to force a ghost line-pair state where a modified memory line cannot be stored back to both the operand and instruction caches in replacement of both members of a memory line-pair has been described.

In light of the above teachings, many modifications and variations of the present invention are possible. It is therefore to be understood that within the scope of the appended claims, the invention may be practiced otherwise than as specifically described above.

We claim:

1. A data processing system comprising:
   a) a mainstore memory unit for storing a plurality of memory lines, wherein predetermined memory lines include operand data;
   b) a central processing unit including an execution unit for processing operand data, a cache memory, coupled to said mainstore memory unit and said execution unit, for storing memory lines as received from said mainstore memory unit and operand data as received from said execution unit, a primary cache tag store for storing memory line status information corresponding to memory lines stored in said cache memory, the memory line status information including validity status of the corresponding memory line, and cache control means, coupled to said primary cache tag store, for modifying the memory line status information corresponding to the memory line upon storage of operand data in said cache memory; and
   c) a system controller including a secondary cache tag store for storing memory line status information corresponding to memory lines stored by said cache memory, the memory line status information including validity status of the corresponding memory line, said cache control means operating independently of said system controller with respect to the invalidation of a memory line in said cache memory, resulting in the creation of a ghost memory line state, upon receipt of a memory line from said mainstore memory unit.

2. The data processing system of claim 1 wherein said cache control means selectively creates a ghost memory line state for memory lines stored in said cache memory and wherein the selection to create and the creation of a ghost memory line state by said cache control means is independent of said system controller and the corresponding memory line status stored in said secondary tag store.

3. The data processing system of claim 2 wherein said cache control means creates said ghost memory line state for memory lines where the memory line transfer to said cache memory fails to complete properly.

4. The data processing system of claim 3 wherein said cache memory includes a plurality of memory line storage locations and wherein said cache control means creates said ghost memory line state by storing memory line status information in said primary cache tag store marking the corresponding memory line storage location to which the transfer of a memory line was directed as containing an invalid memory line.

5. The data processing system of claim 4 wherein said cache control means creates said ghost memory line state with respect to memory lines transferred to said cache memory when the transfer is aborted, when the memory line as transferred contains an uncorrectable error, or when the complete memory line cannot be stored at the memory line storage location to which the transfer of the memory line was directed.

6. The data processing system of claim 1 wherein said central processing unit includes an instruction unit, wherein said cache memory includes an instruction cache for storing a first plurality of memory lines and an operand cache for storing a second plurality of memory lines, wherein said primary cache tag store stores memory line status information, including memory line pair status and line pair address information, for memory lines in said instruction and operand caches, wherein said cache control means includes means for routing operand data received from said execution unit to said operand cache or to both said operand cache and said instruction cache for storage in respective memory line storage locations, said cache control means determining from the status information stored by said primary cache tag store whether predetermined operand data received from said execution unit is to be stored in a memory line storage location that is a member of a line pair, and whether to modify the validity status information stored for the memory line stored in the line pair corresponding memory line pair storage location of said instruction cache based on whether said routing means is capable of routing said predetermined operand data to the corresponding memory line pair storage location in said instruction cache for storage therein, whereby said data processing system continues to operate without degradation in the presence of the nonidentity in status information stored by said secondary tag store relative to said primary tag store.

7. A cache control system for managing the transfer of memory lines having corresponding system addresses with respect to an instruction execution unit and a mainstore memory unit, said cache control system comprising:

a) a cache memory including a plurality of memory line and tag storage locations, said tag storage locations providing for the storage of memory line status information, said cache memory selectively providing for the storage of first and second copies of a memory line having a predetermined system address as received from said instruction execution unit or from said mainstore memory unit;

b) a system controller having a secondary tag store for storing the memory line status information for the respective memory lines stored by said cache memory; and c) control means for receiving a copy of said memory line having said predetermined system address from said instruction execution unit or from said mainstore memory unit and for accessing and modifying the memory line status information stored in the tag storage location corresponding to said first copy of said memory line having said predetermined system address, said control means marking said first copy of said memory line having said predetermined address as being valid or invalid independent of said system controller maintaining the corresponding memory line status information in said secondary tag store as being marked valid.

8. The cache control system of claim 7 wherein said control means receives a modified copy of said memory line having said predetermined system address from said instruction execution unit for storage as said first and second copies of said memory line having a predetermined system address, and wherein said control means modifies the memory line status information corresponding to said first copy of said memory line having said predetermined system address to mark said first copy of said memory line having a predetermined system address as being invalid when said control means determines that said modified copy of said memory line having said predetermined system address cannot be stored by said cache memory.

9. The cache control system of claim 8 wherein said modified copy of said memory line having said predetermined system address is stored in said cache memory in the memory line storage location of said second copy of said memory line having said predetermined system address.

10. A split-cache controller for storing memory lines with respect to a central processor having an instruction unit and an execution unit, and a computer system control unit, each memory line including instruction and operand data, said split-cache controller comprising:

a) a cache including a memory line tag store, an operand memory line store, an instruction memory line store and means for receiving operand data from said execution unit for storage in either said operand memory line store or said instruction memory line store, or both, said receiving means being coupled to said operand memory line store and said instruction memory line store for transferring a first predetermined width of data to said operand memory line store and a second predetermined width of data to said instruction memory line store, said first predetermined width being greater than said second predetermined width, said memory line tag store providing for the storage of a plurality of memory line tags respectively identifying memory lines stored in said operand and instruction memory line stores; and b) control means, coupled to said memory line tag store and to said receiving means, for determining whether to store operand data of a predetermined memory line received from the execution unit in said operand memory line store or in both said operand and instruction memory line stores, said control means further determining whether said operand data of said predetermined memory line can be transferred by said receiving means to said instruction memory line store, said control means accessing said memory line tag store to modify the memory line tag identifying said predetermined memory line upon transfer of said operand data of said predetermined memory line to said operand memory line store and independent of said computer system controller.

11. The split-cache controller of claim 10 wherein each memory line tag includes data identifying the validity status of its respective memory line, wherein said control means determines whether to store said operand data of said predetermined memory line in said instruction memory line store by determining whether a valid status memory line tag for said predetermined memory line is present in said memory line tag store, said control means modifying the valid status of the memory line tag as present in said memory line tag store to indicate a non-valid status if the operand data of said predetermined memory line cannot be stored in said instruction memory line store.

12. In a data processing system including an instruction processing unit and a system controller, wherein said instruction processing unit includes a split operand and instruction cache for the respective storage of operand and instruction memory lines, a local cache tag store for storing address, validity and line-pair state data with respect to each memory line stored in said split operand and instruction cache, and a splitcache controller for managing said split operand and instruction cache including the occurrence of line-pair states of memory lines as stored in said split operand and instruction cache and wherein said system controller includes a system integrity cache tag store for storing a duplicate of the address and status data stored by said split-cache controller in said local cache tag store, an improvement in the split-cache controller wherein said improvement comprises:

means for invalidating a member of a line-pair of memory lines as recorded in said local cache store whereby a ghost line-pair state is permitted to exist as a discrepancy between the validity and line-pair state data stored by said local cache tag store and the validity and line-pair state data stored by said system integrity cache tag store.

* * * * *